US012726398B2

(12) United States Patent
Ibach

(10) Patent No.: US 12,726,398 B2
(45) Date of Patent: Sep. 1, 2026

(54) SERVICE LEVEL ALARM REPORTING CONTROL

(71) Applicant: Ciena Corporation, Hanover, MD (US)

(72) Inventor: Trevor John Ibach, Manotick (CA)

(73) Assignee: Ciena Corporation, Hanover, MD (US)

( * ) Notice: Subject to any disclaimer, the term of this patent is extended or adjusted under 35 U.S.C. 154(b) by 90 days.

(21) Appl. No.: 18/758,834

(22) Filed: Jun. 28, 2024

(65) Prior Publication Data

US 2026/0005913 A1 Jan. 1, 2026

(51) Int. Cl.
*H04L 41/0604* (2022.01)
*H04L 41/0806* (2022.01)

(52) U.S. Cl.
CPC ...... *H04L 41/0627* (2013.01); *H04L 41/0806* (2013.01)

(58) Field of Classification Search
CPC ........ H04J 3/14; H04L 41/06; H04L 41/0604; H04L 41/0622; H04L 41/0627; H04L 41/50; H04L 41/5032; H04L 41/5077
See application file for complete search history.

(56) References Cited

U.S. PATENT DOCUMENTS 8,355,316 B1 * 1/2013 Lushear .............. H04L 41/0677 370/242
9,088,380 B2 7/2015 Ibach et al.
9,143,227 B2 9/2015 Oltman et al.
10,826,600 B2 11/2020 Ibach et al.
10,979,139 B1 4/2021 Ibach et al.
11,101,882 B1 8/2021 Ibach et al.
2006/0031482 A1 * 2/2006 Mohan ................ H04L 41/0631 709/224
2006/0073822 A1 * 4/2006 Orton .................. H04L 41/0627 340/506
2019/0174211 A1 6/2019 Swinkels et al.
2020/0396001 A1 12/2020 Ibach et al.
2021/0281342 A1 9/2021 Ibach et al.
2023/0254217 A1 * 8/2023 Zacharias ........... H04L 41/0813 709/220

OTHER PUBLICATIONS

"Common equipment management function requirements". ITU-T Recommendation G.7710/Y.1701. Nov. 2001 (Year: 2001).*

(Continued)

*Primary Examiner* — Vivek Srivastava
*Assistant Examiner* — William C Mcbeth
(74) *Attorney, Agent, or Firm* — Baratta Law PLLC; Lawrence A. Baratta, Jr.

(57) ABSTRACT

A network element includes a plurality of ports configured to connect to a network; and circuitry configured to configure a service with a second network element in the network where the service utilizes a plurality of resources on the network element and the second network element, configure alarm suppression on the service, detect faults associated with the plurality of resources for the service and suppress reporting of alarms based on the alarm suppression, and remove the alarm suppression responsive to a period of time where there are no detected faults associated with all of the plurality of resources. The alarm suppression can be controlled by one of Alarm Reporting Control (ARC) and Auto In-Service (AINS).

17 Claims, 15 Drawing Sheets

(56) References Cited

OTHER PUBLICATIONS

Lam et al. "Alarm Reporting Control Management Information Base (MIB)". IETF Network Working Group RFC 3878. Sep. 2004 (Year: 2004).*

Telecommunication Standardization Sector of ITU, "Generic network information model," Recommendation M.3100, Apr. 2005, 98 Pages.

* cited by examiner

Stage 1 – New service configured, service down at A and Z ends

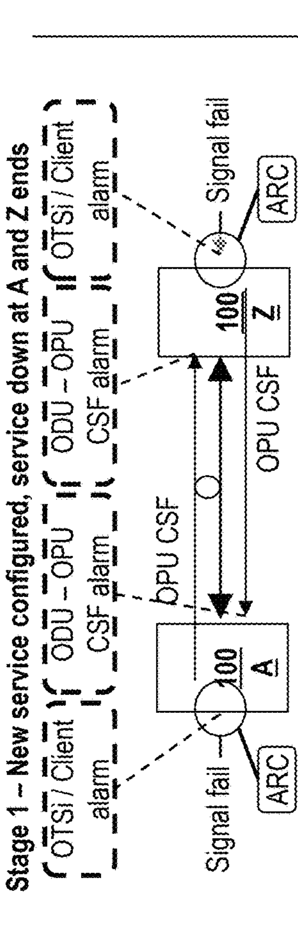

- Alarm Reporting Control is enabled at A and Z ends when the service is first configured
- OTSi / Client / ODU alarm reporting is disabled at each end

Stage 2 – Service comes up at the Z end

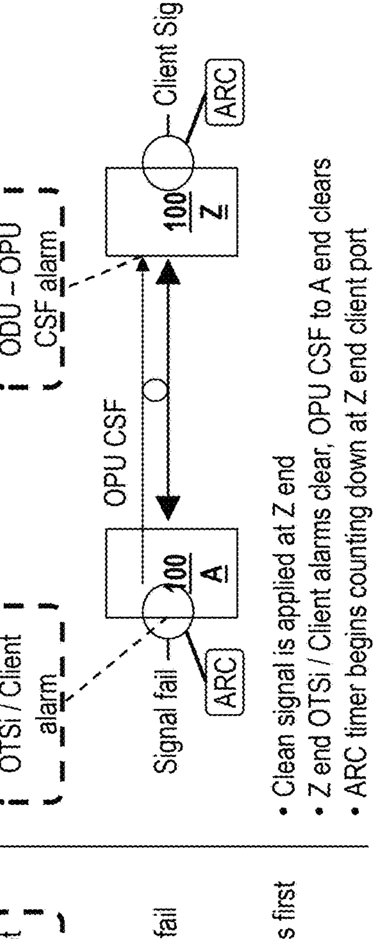

- Clean signal is applied at Z end
- Z end OTSi / Client alarms clear, OPU CSF to A end clears
- ARC timer begins counting down at Z end client port

Stage 3 – Z end exits AINS

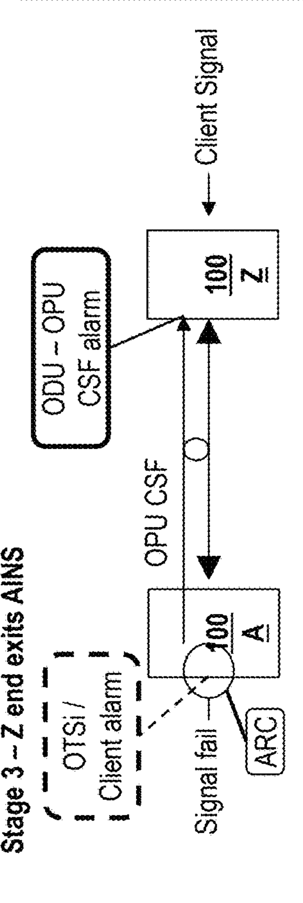

- Z end client port exits ARC, along with the ODU resource
- OPU CSF alarm at Z end raised because the ODU resource no longer has Alarm Reporting Control applied

*FIG. 3*

Stage 1 – New service configured, service down at A and Z ends

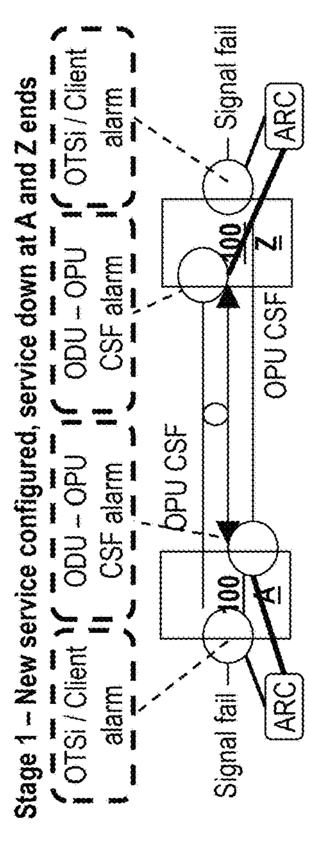

- Alarm Reporting Control is enabled for OTSi, client and ODU resources at A and Z ends when the service is first configured
- OTSi / Client / ODU alarm reporting is disabled at each end

Stage 2a – Service comes up at the Z end

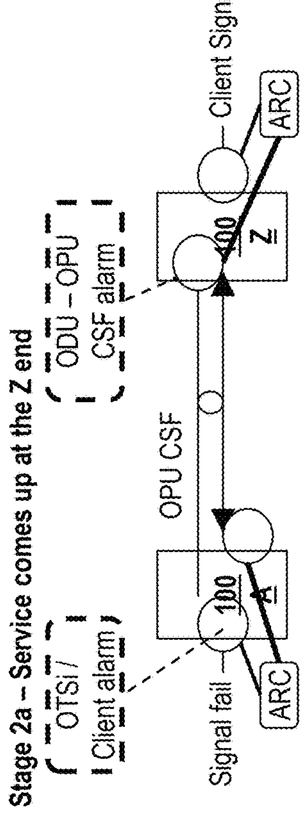

- Clean signal is applied at Z end
- Z end OTSi / Client alarms clear
- OPU CSF to A end clears, alarm at A end clears
- Alarm Reporting Control remains for the duration of the timeout period

Stage 2b – Some resources exit the Not Alarmed state

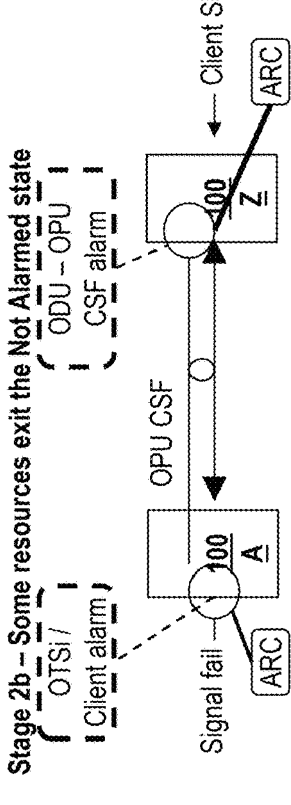

- Alarm Reporting Control exits the Not Reported state for the Z end OTSi / client resource, and the A end ODU resource because those are alarm free
- The A end OTSi / client and Z end ODU resources remain in the Not Reported state because they still have alarms

Stage 3 – Z end client fails

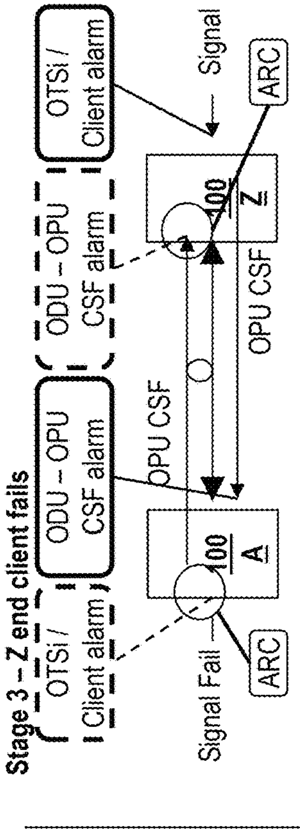

- Z end client signal fails again, because the subtending equipment is not fully operational
- Z end OTSi / Client alarms and A end ODU alarms are raised because those resources are no longer in the Not Reported state

*FIG. 4*

Stage 1 – New service configured, service down at A and Z ends

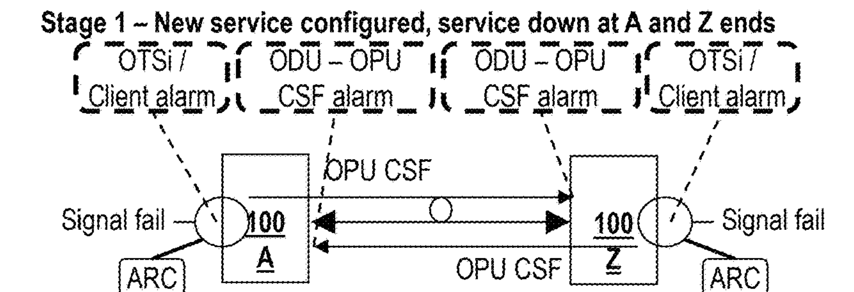

- Alarm Reporting Control is enabled at A and Z ends when the service is first configured
- OTSi / Client / ODU alarm reporting is disabled at each end

Stage 2a – Service comes up at the Z end

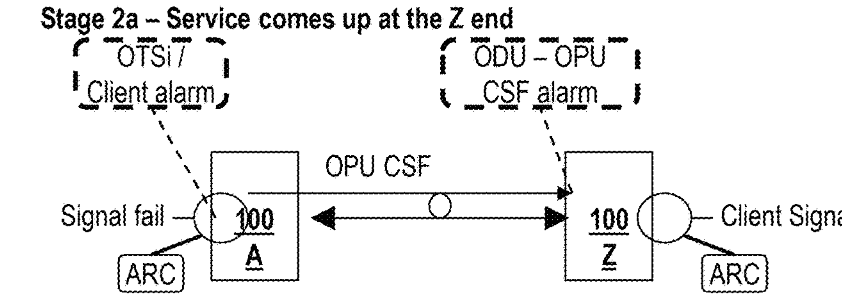

- Clean signal is applied at Z end
- Z end OTSi / Client alarms clear
- OPU CSF to A end clears
- Alarm Reporting Control remains at Z end because there is still a service alarm

Stage 2b – ARC remains active at Z end

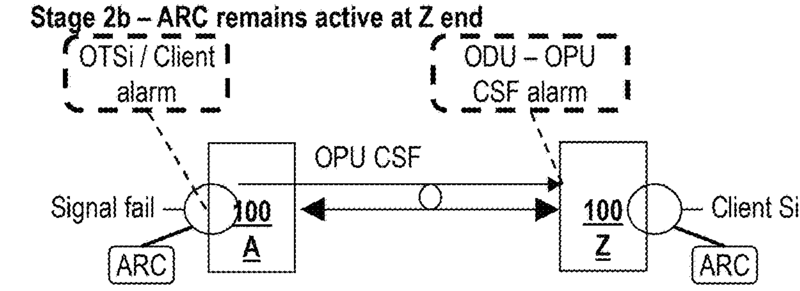

- Alarm Reporting Control remains at Z end because there is still a service alarm
- OTSi / Client / ODU alarms remain disabled at the Z end because Alarm Reporting Control is still being applied

Stage 3 – Service comes up at the A end

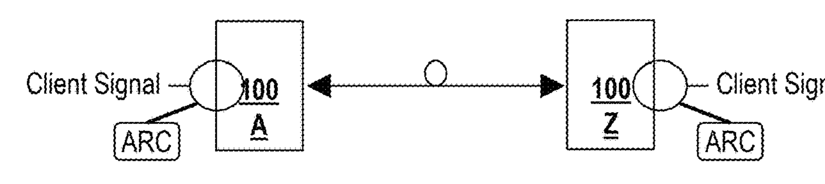

- Clean signal is applied at A end
- A end OTSi / Client alarms clear, OPU CSF to Z end clears
- ARC timer begins counting down at each of A and Z ends
- When ARC is removed from A and Z ends, the service will be alarm-free at both ends

*FIG. 5*

SERVICE LEVEL ALARM REPORTING CONTROL

FIELD OF THE DISCLOSURE

The present disclosure relates generally to networking and computing. More particularly, the present disclosure relates to systems and methods for service level Alarm Reporting Control (ARC)/Auto In-Service (AINS) control.

BACKGROUND OF THE DISCLOSURE

Alarm Reporting Control (ARC) and Auto In-Service (AINS) are functionalities within telecommunications and network management, such as in optical and packet networks. ARC and AINS both use sophisticated mechanisms to temporarily suppress alarms and then allow them to be reported once the conditions warrant it. ARC employs correlation and deduplication to identify and group related alarms, filtering out duplicates to prevent alarm floods from overwhelming operators. It also uses threshold-based filtering to ensure that only alarms exceeding specific criteria are reported. During the initial stages of AINS, alarms are suppressed to avoid unnecessary notifications caused by expected transitional states or minor inconsistencies as network elements and services are being provisioned and activated. Once the provisioning process is complete and the network elements, subtending equipment, and connections are stable and operational, the suppression is lifted, allowing genuine alarms to be reported. This phased approach ensures that alarms reflect true issues that require attention, maintaining a balance between effective monitoring and preventing alarm fatigue. The basic ARC functionality is described in M.3100. AINS functionality is similar and is described in Ericsson (formerly Telcordia) GR-1093-CORE.

BRIEF SUMMARY OF THE DISCLOSURE

The present disclosure relates to both ARC and AINS, focusing on service level control. ARC and AINS both include functionality which allows a device to turn off autonomous alarm reporting, and use fault information to (eventually) automatically transition to a state where alarms can be reported. Conventional approaches to ARC and AINS have problems when a subset of resources independently exit a not reporting alarm state, even if an entire service is not up, leading to problems. As described herein, the entire service being up is considered end-to-end across a network domain, in both directions. To that end, the present disclosure uses fault information from all resources which are part of a given service, and uses that to perform an ARC function for the entire service as a whole. Accordingly, a fault on any of the affected resources of that service will prevent alarm reporting for all resources of that service. The present disclosure includes correlating fault information across multiple resources to act as one ARC function, using near-end, far-end and reverse faults across all of these resources to provide a single-ended, independent solution for ARC for a network service.

In an embodiment, a network element includes a plurality of ports configured to connect to a network; and circuitry configured to provision a service with a second network element in the network where the service utilizes a plurality of resources on the network element and the second network element, configure alarm suppression on the service, detect faults associated with the plurality of resources for the service and suppress reporting of alarms based on the alarm suppression, and remove the alarm suppression responsive to a period of time where there are no detected faults associated with all of the plurality of resources. The circuitry can be further configured to, subsequent to the removed alarm suppression, report any new alarms associated with the plurality of resources for the service to a management system.

The plurality of resources include monitor points at the network element and the second network element, operating independently of one another, and wherein the monitor points include any of a network port, a client port, and intermediate points between the network port and the client port. The faults associated with the plurality of resources at the second network element can include propagation of fault information from the second network element and faults coming from the network. The circuitry can be further configured to monitor the detected faults associated with the plurality of resources for the service and not start a timer until there are no detected faults associated with the plurality of resources. The alarm suppression is controlled by one of Alarm Reporting Control (ARC) and Auto In-Service (AINS). The alarm suppression can be configured when the service is new or when the service is undergoing maintenance. The service can be one of based on Optical Transport Network (OTN), based on Flexible Optical Transport Network (FlexO), and Ethernet.

In another embodiment, the present disclosure includes a method including steps and a non-transitory computer-readable medium stores instructions that, when executed, cause one or more processors to implement the steps. The steps include provisioning a service with a second network element in the network where the service utilizes a plurality of resources on the network element and the second network element; configuring alarm suppression on the service; detecting faults associated with the plurality of resources for the service and suppressing reporting of alarms based on the alarm suppression; and removing the alarm suppression responsive to a period of time where there are no detected faults associated with all of the plurality of resources. The steps can further include, subsequent to the removed alarm suppression, reporting any new alarms associated with the plurality of resources for the service to a management system.

The plurality of resources can include monitor points at the network element and the second network element, operating independently of one another, and wherein the monitor points include any of a network port, a client port, and intermediate points between the network port and the client port. The faults associated with the plurality of resources at the second network element can include propagation of fault information from the second network element and faults coming from the network. The steps can further include monitoring the detected faults associated with the plurality of resources for the service and not starting a timer until there are no detected faults associated with the plurality of resources. The alarm suppression is controlled by one of Alarm Reporting Control (ARC) and Auto In-Service (AINS). The alarm suppression can be configured when the service is new or when the service is undergoing maintenance. The service can be one of based on Optical Transport Network (OTN), based on Flexible Optical Transport Network (FlexO), and Ethernet.

In a further embodiment, the present disclosure includes a method including steps and a non-transitory computer-readable medium stores instructions that, when executed, cause one or more processors to implement the steps. The steps include communicating with a plurality of network elements in a network; configuring a service between two network elements of the plurality of network elements where the service utilizes a plurality of resources on the two network elements; configuring alarm suppression on the service, where alarms associated with faults detected on the plurality of resources for the service detected at the two network elements are suppressed and not reported; and receiving new alarms associated with faults detected on the plurality of resources for the service subsequent to passing of a period of time where there are no detected faults at the two network elements associated with all of the plurality of resources.

The plurality of resources can include monitor points at the two network elements, operating independently of one another, and wherein the monitor points include any of a network port, a client port, and intermediate points between the network port and the client port. The alarm suppression is controlled by one of Alarm Reporting Control (ARC) and Auto In-Service (AINS). The service can be one of based on Optical Transport Network (OTN), based on Flexible Optical Transport Network (FlexO), and Ethernet.

BRIEF DESCRIPTION OF THE DRAWINGS

The present disclosure is detailed through various drawings, where like components or steps are indicated by identical reference numbers for clarity and consistency.

FIG. 3 illustrates applying Alarm Reporting Control based on only faults from some resources, or not based on far-end faults, can lead to situations where alarms are reported before the service is up at each end of the network.

FIG. 4 illustrates how applying Alarm Reporting Control independently at individual resources can lead to situations where alarms are reported before the service is up at each end of the network.

FIG. 5 illustrates how the present disclosure can prevent alarms from being reported until the service is up at each end of the network.

DETAILED DESCRIPTION OF THE DISCLOSURE

Again, the present disclosure relates to both ARC and AINS, focusing on service level control. For illustrative purposes, the present disclosure uses ARC, but those skilled in the art will appreciate the same aspects can apply to AINS. The objective of the present disclosure includes ensuring alarm suppression in ARC or AINS is tied to an end-to-end network service.

Example Network Element/Node

Figure 1:
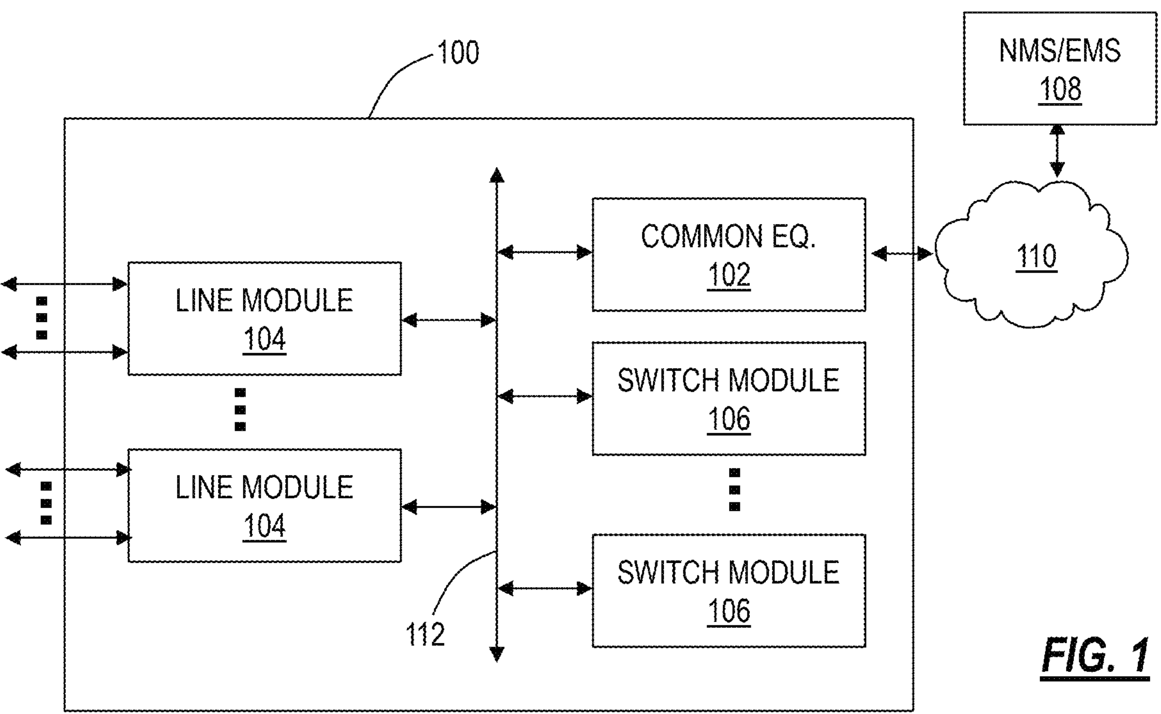
FIG. 1 illustrates an example network element for use with the systems and methods described herein

FIG. 1 illustrates an example network element 100 for use with the systems and methods described herein. In one embodiment, the network element 100 consolidates the functions of a Wavelength Division Multiplexed (WDM)/Dense WDM (DWDM) platform, optical switch, Reconfigurable Optical Add/Drop Multiplexer (ROADM), packet switch and more into a single, high-capacity intelligent switching system providing Layer 0, 1, 2, and/or 3 consolidation. Alternatively, the network element 100 could perform a subset of these functions. Essentially, the network element 100 can be any digital and/or optical system that handles ingress and egress digital and/or optical signals and switching of channels, timeslots, tributary units, wavelengths, etc.

In an example embodiment, the network element 100 includes common equipment 102, one or more line modules 104, and one or more switch modules 106. The common equipment 102 can include power supplies, a control module, Operations, Administration, Maintenance, and Provisioning (OAM&P) access, user interface ports, and more. It connects to a management system 108 through a data communication network 110 and may include a control plane processor, such as a processing system 200 (illustrated in FIG. 2), configured to operate the control plane. The management system 108 can be a Network Management System (NMS), Element Management System (EMS), Software Defined Networking (SDN) controller, orchestrator, etc. The network element 100 can provide data to the management system 108, such as alarm reporting. An interface 112 communicatively couples the common equipment 102, line modules 104, and switch modules 106 to one another. This interface 112 can be a backplane, midplane, bus, and/or optical/electrical connectors. The line modules 104 provide ingress and egress to the switch modules 106 and to external connections on links to/from the network element 100. In some configurations, the line modules 104 and switch modules 106 form ingress and egress switches.

The line modules 104 can include multiple optical and/or electrical connections per module, with flexible rate support for any type of connection. They may have WDM interfaces, short-reach interfaces, and connections to remote network elements, end clients, edge routers, and more, forming network links. Logically, the line modules 104 provide ingress and egress ports to the network element 100, each containing one or more physical ports. The switch modules 106 switches channels, timeslots, tributary units, packets, etc., between the line modules 104, offering wavelength granularity (Layer 0 switching), Layer 1 granularity (e.g., Optical Transport Network (OTN), Flexible OTN (FlexO), etc.), Ethernet granularity, and more. They may include Time Division Multiplexed (TDM) and/or packet switching engines.

It is understood by those skilled in the art that the network element 100 can include other components not shown for illustration purposes and that the systems and methods described can be used with various network elements. For example, the network element 100 might not include switch modules 106, instead having this functionality distributed across line modules 104 or equivalents. In some architectures, like a DWDM terminal, switch modules 106 and their functions might be omitted. The described systems and methods can apply to any network element, with network element 100 serving as an example. Fundamentally, the network element 100 is a collection of physical ports and circuitry configured to interface services between the physical ports. The embodiment of FIG. 1 is meant to convey the functionality of the network element 100, and those skilled in the art will appreciate physical implementations may vary.

Example Controller

Figure 2:
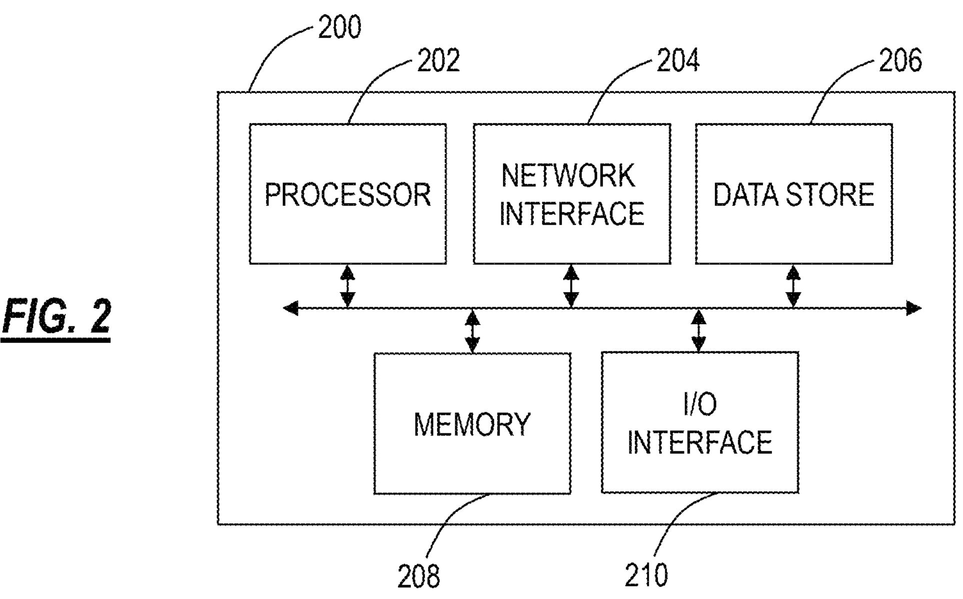
FIG. 2 illustrates a processing system, which can serve as a controller for the network element of FIG. 1, the management system in FIG. 1, or similar systems.

FIG. 2 illustrates a processing system 200, which can serve as a controller for the network element 100, the management system 108, or similar systems. The processing system 200 can be part of the common equipment, like common equipment 102 in the network element 100, or a stand-alone device connected to the network element 100 via the data communication network 110. In a stand-alone setup, the processing system 200 can function as the management system 108. The processing system 200 includes a processor 202, a hardware device for executing software instructions to operate the control plane. The processor 202 can be any custom-made or commercially available processor, such as a CPU, an auxiliary processor among several processors in the processing system 200, a semiconductor-based microprocessor (in the form of a microchip or chipset), or any device capable of executing software instructions. When in operation, the processor 202 executes software stored in memory, communicates data to and from the memory, and generally controls the processing system 200 operations according to the software instructions.

The processing system 200 also includes a network interface 204, a data store 206, memory 208, and an I/O interface 210, all communicatively connected to the processor 202. The network interface 204 enables the processing system 200 to communicate on a Data Communication Network (DCN), exchanging control plane information with other controllers, a management system, network elements 100, and similar devices. The network interface 204 can include an Ethernet module and necessary address, control, and data connections for appropriate network communications. The data store 206 stores data such as control plane information, provisioning data, and OAM&P data. It can include volatile memory (e.g., RAM such as DRAM, SRAM, SDRAM) and nonvolatile memory (e.g., ROM, hard drive, flash drive, CDROM), as well as combinations of these. The data store 206 may utilize electronic, magnetic, optical, and other storage media. The memory 208 also includes volatile and nonvolatile memory elements and may have a distributed architecture, allowing the processor 202 to access remotely situated components. The I/O interface 210 facilitates communication between the processing system 200 and other devices, including other nodes, using overhead associated with traffic signals.

M.3100

In ITU-T Recommendation M.3100, a service in a network is an abstract entity representing the functionalities provided to users or applications by leveraging various network resources. It involves defining service types and attributes, provisioning and activating service instances, and ensuring continuous performance monitoring to meet specific quality of service (QOS) and service level agreements (SLAs). A service includes endpoints, logical connections (paths and circuits), and resource bindings, with lifecycle management processes such as provisioning, activation, monitoring, fault management, modification, and deactivation. For example, an optical service would involve allocating specific wavelengths, configuring optical switches and transponders, ensuring high bandwidth and low latency, and continuously monitoring signal quality and performance to maintain agreed performance levels. This structured approach ensures interoperability, consistency, and efficient management of network services.

Alarm reporting with the M.3100 standard in a network involves a structured framework for the detection, categorization, and management of network faults and performance issues. When the network elements 100 encounter problems, they generate alarms which are communicated to the management system 108. These alarms are categorized by severity—typically as critical, major, minor, or warning—allowing network operators to prioritize their responses effectively. The M.3100 standard ensures that alarms are reported consistently and comprehensively, enabling timely identification and resolution of issues to maintain network reliability and performance. Additionally, it specifies protocols for alarm correlation and filtering to reduce the volume of alarms and focus on significant events, enhancing overall network management efficiency.

Alarm Suppression

Alarm suppression in ARC or AINS is a mechanism used to manage and reduce the number of alarms presented to network operators by temporarily hiding or suppressing non-critical or redundant alarms during periods of alarm storms or heavy network activity. This helps prevent operators from being overwhelmed and ensures they can focus on resolving the most critical issues first. Suppression can be based on predefined criteria such as the type, source, or frequency of alarms. Once the network stabilizes or the predefined conditions for suppression no longer apply, the alarm suppression can be released allowing alarms to be displayed to the operators. This release can occur automatically after a certain period, once the system detects that the network conditions have improved, or manually by operator intervention, ensuring that all issues are eventually addressed without missing any significant events.

Services and Resources

The present disclosure utilizes OTN for illustration purposes and those skilled in the art will recognize ARC and AINS can apply to other protocols, e.g., packet, ZR, FlexO, etc. In general, for alarming purposes, a resource is any point which is monitored for alarm purposes. The resource can be a client port, a network port, a Tandem Connection Monitoring (TCM) point, an Optical Transport Signal (OTSi) or Optical Channel (Och), a client layer, an Optical Data Unit (ODU) Performance Monitoring (PM) point, etc. Again, these are example resources in OTN, which is a Layer 1 Time Division Multiplexing (TDM) protocol, and other protocols can include different points. The key aspect of any resource is that it supports monitoring and associated alarms for each resource. Now, a service is between two ports in a network, e.g., between two network elements 100, and any given service will be managed using a collection of multiple resources.

Within a service, there are two different behaviors which can apply to each resource:

(1) The resource will have its alarm reporting turned off as part of alarm reporting being turned off for the entire service. This applies to all resources which are part of a given service (2) Faults on the resource may impact the Alarm Reporting Control for the entire service. This may or may not apply to all resources which are part of a given service.

Problem

Alarm Reporting Control for a subset of resources, representing just the external port type can operate for faults with the physical signal being applied at the port, but will not control alarm reporting based on faults from within the network or from the far end of the network.

Alarm Reporting Control on individual, independent resources can allow some resources to independently automatically exit their Not Reported state even if the entire service is not up. If that resource later receives a fault after exiting the Not Reported state then it will raise the alarm even though the service is not up. Again, this means the service, namely the entire service is up/not up bidirectionally end-to-end.

Alarm Reporting Control using communications channels to send fault or alarm reporting information are dependent on those communications channels being configured. Without that communications channel, far-end faults (e.g. loss of signal at the far end of the network, or loss of signal at the subtending client equipment) cannot be communicated. There may be technical reasons why it cannot be done, or why it may not be operating in a network.

(1) The client port may be Ethernet and not contain a communications channel.

(2) The client port may be another vendor's equipment, which does not communicate with our equipment.

FIG. 3 illustrates applying Alarm Reporting Control based on only faults from some resources, or not based on far-end faults, can lead to situations where alarms are reported before the service is up at each end of the network. Again, FIG. 3 illustrates an OTN application where there are two network elements 100A, 100Z. At stage 1, a new service is configured, and the new service is down at both of the network elements 100A, 100Z. Alarm Reporting Control is enabled at the client ports of the service on each of the network elements 100A, 100Z. As such, at stage 1, OTSi/Client/ODU alarm reporting is disabled at each end. At this stage 1, there are OTSi/Client alarms on the client ports, and ODU-Optical Path Unit (OPU) Client Signal Failure (CSF) alarms coming from the network, originating from the far-end of the service.

At stage 2, a client signal is connected to the client port on the network element 100Z. As such, the OTSi/Client alarms on the client port of the network element 100Z clear, and the OPU CSF alarms to the network element 100A end clears. This begins a timer to exit the Not Reported state in ARC, for the client port at the network element 100Z only. At stage 2, the client port at the network element 100Z exits ARC. The client port exits ARC, along with the ODU resource. However, the client signal has not been attached at the client port of the network element 100A, and an OPU CSF alarm is raised at the network element 100Z because the ODU resource no longer has Alarm Reporting Control applied. This defeats the expectation of ARC to suppress alarms until the service is alarm free.

FIG. 4 illustrates how applying Alarm Reporting Control independently at individual resources can lead to situations where alarms are reported before the service is up at each end of the network. At stage 1, a new service is configured, and the new service is down at both of the network elements 100A, 100Z. Compared to FIG. 3, in FIG. 4, Alarm Reporting Control is enabled for OTSi, client and ODU resources independently at the network elements 100A, 100Z when the service is first configured, i.e., at both the client ports and the network facing resources. OTSi/Client/ODU alarm reporting is disabled at each end at stage 1.

At stage 2*a*, the service comes up at the network element 100Z, i.e., a client signal is connected to the client port on the network element 100Z. The network element 100Z end OTSi/Client alarms clear, and the OPU CSF alarm to the network element 100A end clears, and the alarm at the network element 100A end clears. Alarm Reporting Control remains for the duration of the timeout period.

At stage 2*b*, some resources exit the Not Alarmed state. Note, the terms "Not Reported" and "Not Alarmed" mean there is alarm suppression due to ARC or AINS. Alarm Reporting Control exits the Not Reported state for the network element 100Z end OTSi/client resource, and the network element 100A end ODU resource because those are alarm free. The network element 100A end OTSi/client and the network element 100Z end ODU resources remain in the Not Reported state because they still have alarms.

At stage 3, the client fails at the network element 100Z. Here, in this example, the network element 100Z end client signal fails again, e.g., because the subtending equipment is not fully operational. The network element 100Z end OTSi/Client alarms and the network element 100A end ODU alarms are raised because those resources are no longer in the Not Reported state, i.e., the end-to-end bidirectional service is not up, and thus the expectation is that all alarms for this service remain suppressed.

Service Level Alarm Reporting Control

To overcome the aforementioned problems which lead to ARC or AINS exiting the alarm suppression state prematurely, the present disclosure takes the fault information from all resources which are part of a given service, and uses that to perform an Alarm Reporting Control function for the entire service as a whole. This means that a fault on any of the affected resources of that service will prevent alarm reporting for all resources of that service. Additionally, by using all fault information from these resources, including far-end and reverse faults, Alarm Reporting Control can be applied at each end of the service independently without the need for communicating the fault status or alarm reporting status along the service path.

Conventionally, ARC or AINS operate for a subset of resources, e.g., representing just the external port type. The present disclosure overcomes these limitations from Alarm Reporting Control on individual, independent resources by combining all inputs for a given service into a single Alarm Reporting Control function for all resources which are part of that service. Thus, they all exit the Not Reported state only when all of them have been fault free for the appropriate waiting period. This includes:

(1) Faults with the physical signal being applied at the port.

(2) Faults with the transport path layer carrying the signal through the network (ODU path for OTN networks).

(3) Faults from the far end which may be communicated via the payload mapping layer (CSF defect in the OPU overhead for OTN networks).

This allows control over alarm reporting based on all of physical client signal faults, network faults, or far-end faults. This overcomes the limitations from Alarm Reporting Control using communications channels by using only standards based signaling and responding to all near-end and far-end faults, so there is no reliance on communications channels for fault/reporting status from anywhere in the network. This also removes any reliance on the upstream/far-end equipment needing to support any proprietary communications mechanism, so this solution will work with virtually any other equipment in the network, and with any standard subtending equipment.

FIG. 5 illustrates how the present disclosure can prevent alarms from being reported until the service is up at each end of the network. At stage 1, a new service is configured, and the service is down at both the network elements 100A, 100Z. As in FIGS. 3-4, Alarm Reporting Control is enabled at the network elements 100A, 100Z when the service is first configured. OTSi/Client/ODU alarm reporting is disabled at each network element 100A, 100Z.

At stage 2*a*, the service comes up at the network element 100Z, i.e., a client signal is connected to the client port on the network element 100Z. The network element 100Z end OTSi/Client alarms clear, and the OPU CSF alarms to the network element 100A end clear. However, with the approach described herein, Alarm Reporting Control remains active at the network element 100Z end because there is still a service alarm, namely an ODU-OPU CSF alarm on the ODU resource for this client service on network element 100Z, which is a result of the OTSi client alarm at the client port on the network element 100A.

At stage **2*b*, the Alarm Reporting Control remains active at the network element 100Z. Alarm Reporting Control remains at the network element 100Z end because there is still a service alarm. OTSi/Client/ODU alarms remain disabled at the network element 100Z** end because Alarm Reporting Control is still being applied.

At stage 3, the service comes up at the network element 100A, i.e., a client signal is connected to the client port on the network element 100A. The network element 100A end OTSi/Client alarms clear, and the OPU CSF alarm to the network element 100Z clears. An ARC timer begins counting down at each of the network elements 100A, 100Z. When ARC is removed from each of the network elements 100A, 100Z, the service will be alarm-free at both ends.

Example Services

FIGS. 6-15 illustrate example services in a network between two network elements 100A, 100Z. Some of these example services include:

(1) Non-OTN client services being carried within an OTN (ODU/OPU) payload.
(2) TCM services for the ODU path which originates/terminates where a non-OTN client is mapped into the OTN payload.
(3) OTU services which are OTN lines to other devices.
(4) TCM services which originate/terminate on the OTU port.
(5) TCM services being carried transparently through an OTU port.
(6) TCM services across a network which carry a payload from an OTU port Note that some layers, such as FlexO-x, may not be included in the FIGS. 6-15 but the same principles apply. Other network types may have similar services defined.

Figure 6:
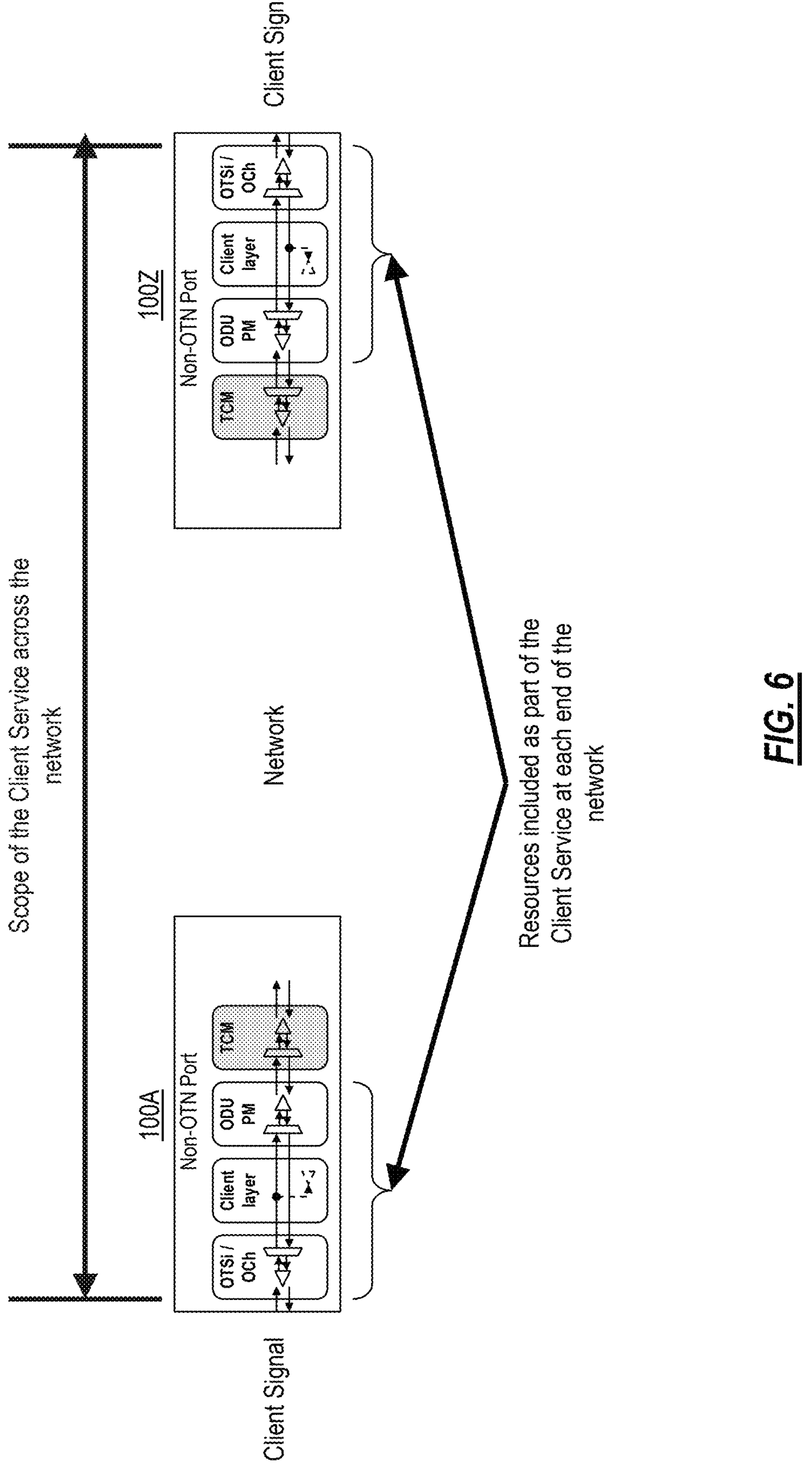
FIGS. 6-15 illustrate example services in a network between two network elements.

FIG. 6 illustrates a Non-OTN client service being carried within an OTN (ODU/OPU) payload. In this example, the service is end-to-end between the client ports of the network elements 100A, 100Z. The resources include OTSi/OCh, client layer, and ODU PM at each of the network elements 100A, 100Z. Alarm suppression remains on this Non-OTN client service until all of these resources are alarm free, at both the network elements 100A, 100Z. This includes local alarms as well as alarms reported from the far end.

Figure 7:
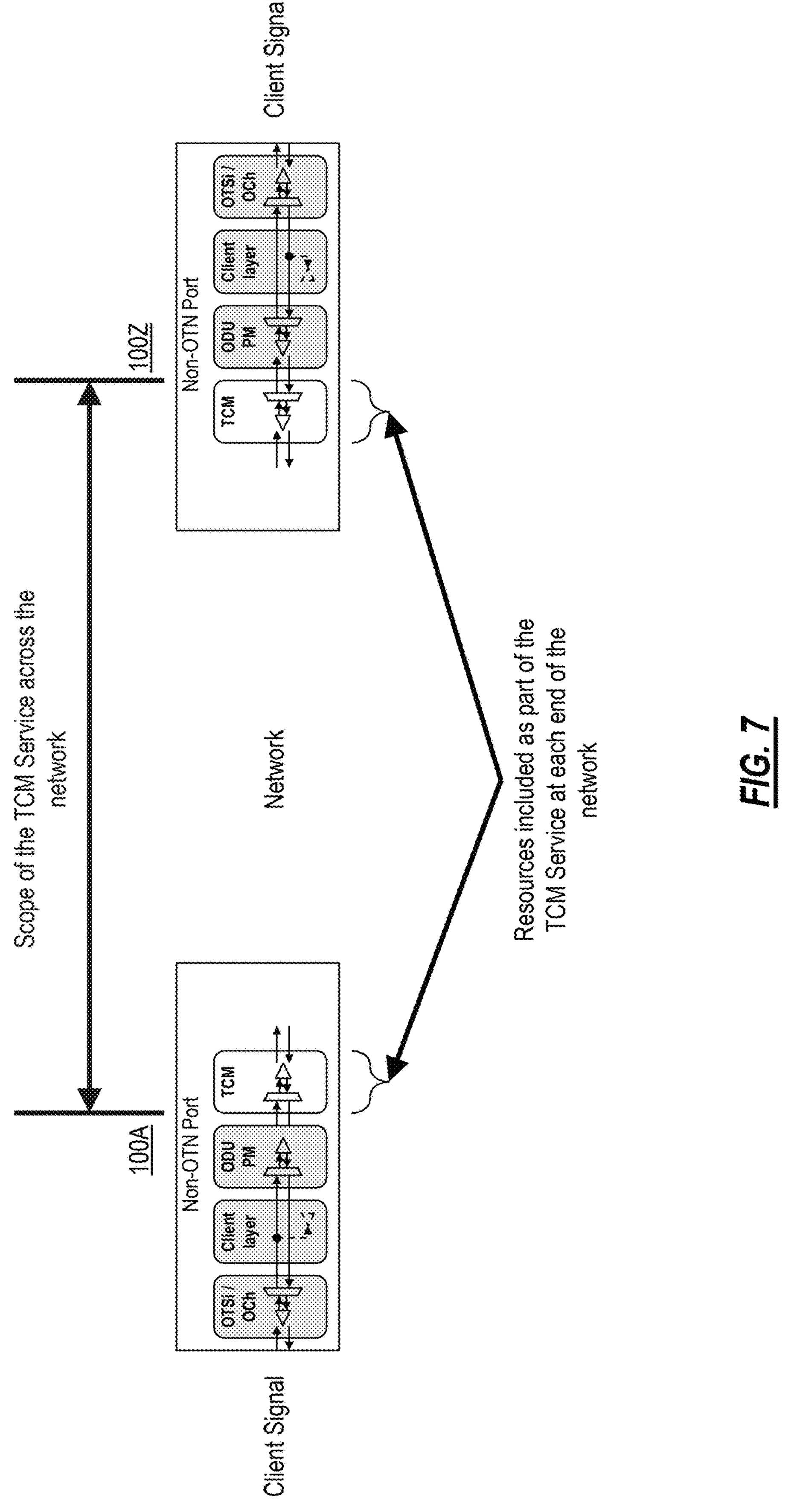

FIG. 7 illustrates a TCM Service over ODU Path for Non-OTN Client. In this example, the service is between two TCM monitor ports, which are also the resources. Alarm suppression remains on this TCM service until both of the TCM monitor ports are alarm free, at both the network elements 100A, 100Z.

Figure 8:
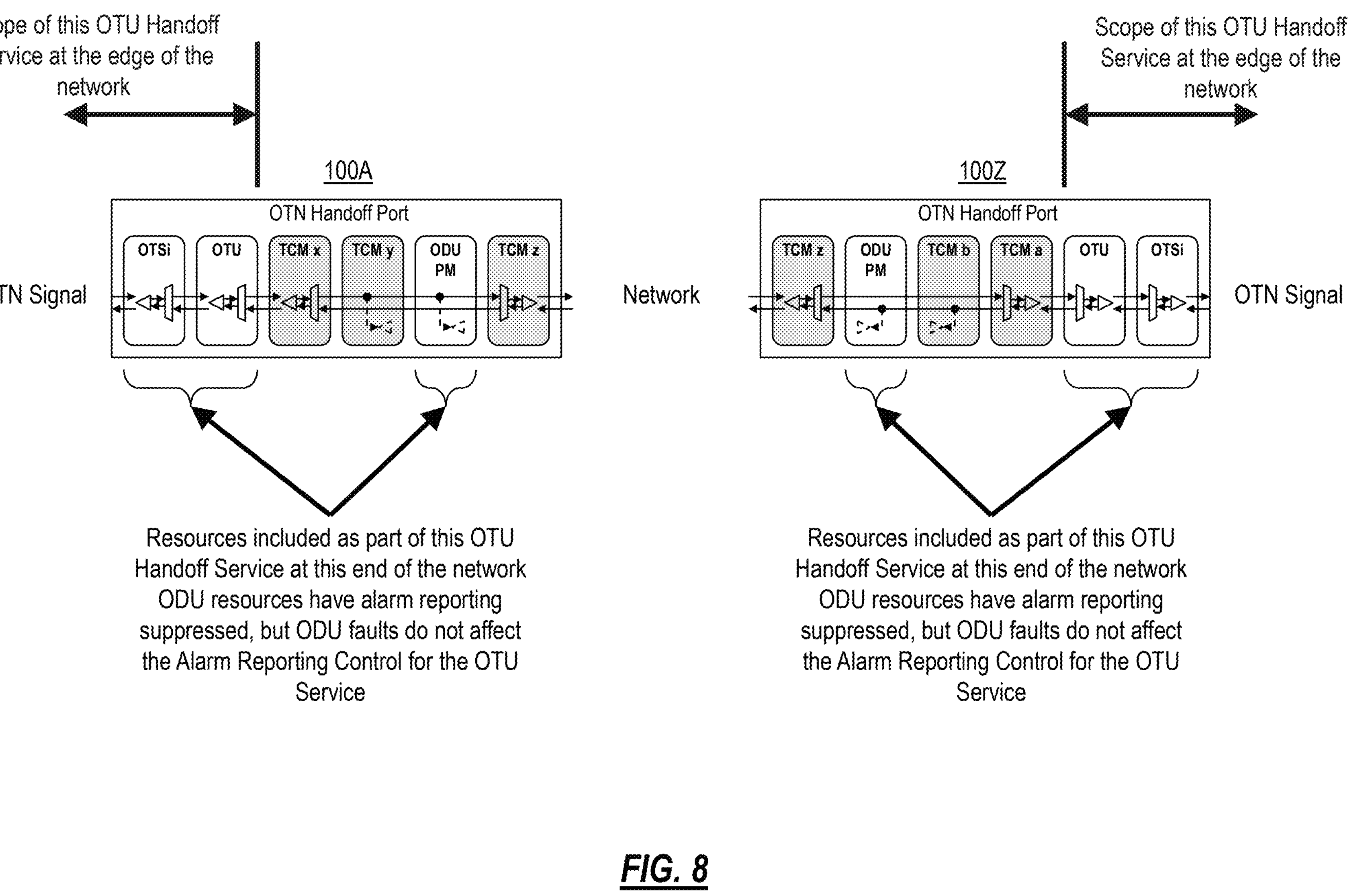

FIG. 8 illustrates an OTU service handoff. Here, the service is handed off from the client ports of the network elements 100A, 100Z. Here, each end (the network elements 100A, 100Z) are independent of each other. The service at each end is explicitly from this OTU port to the subtending equipment. The resources include OTSi, OTU, and ODU PM.

Figure 9:
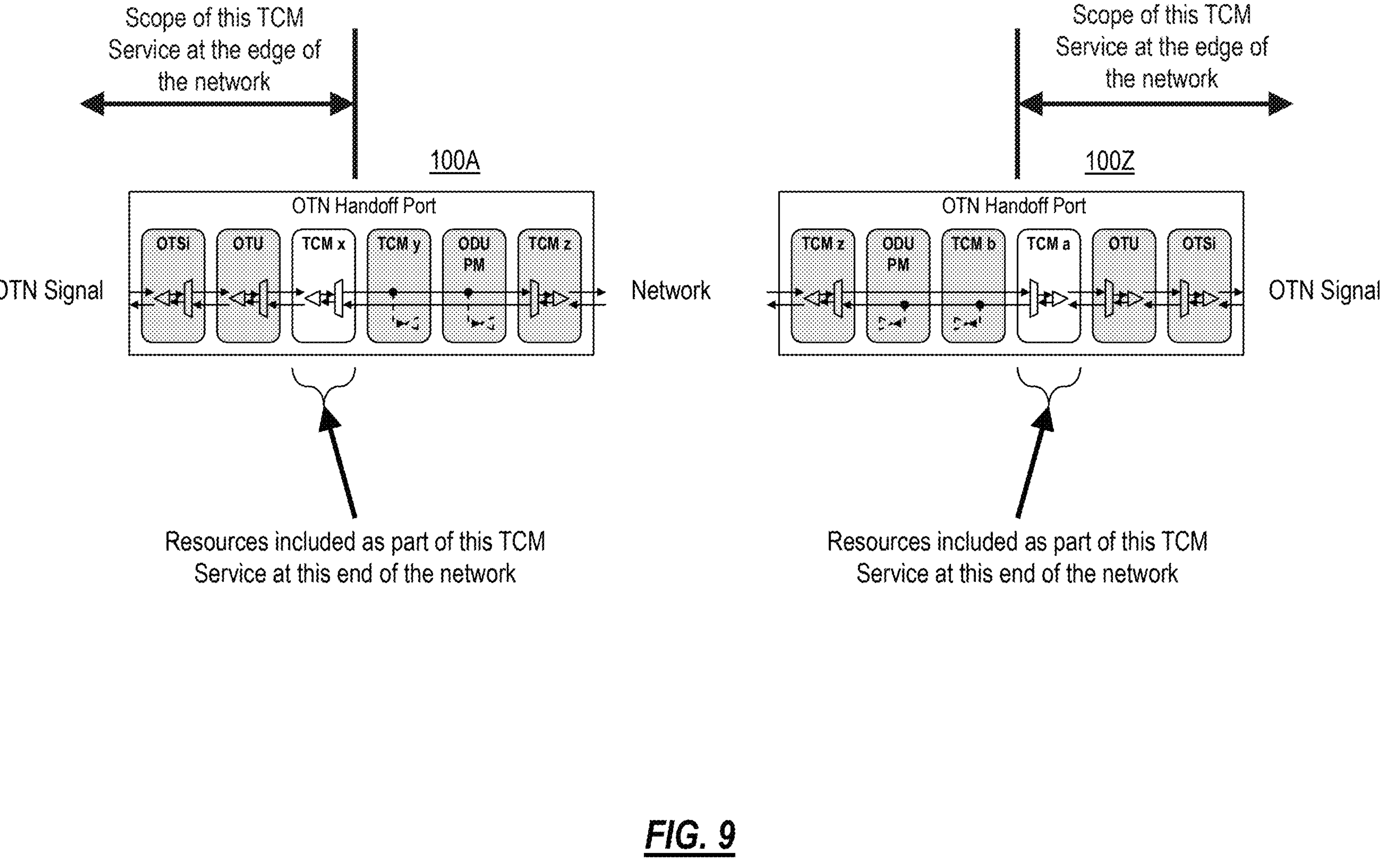
Figure 10:
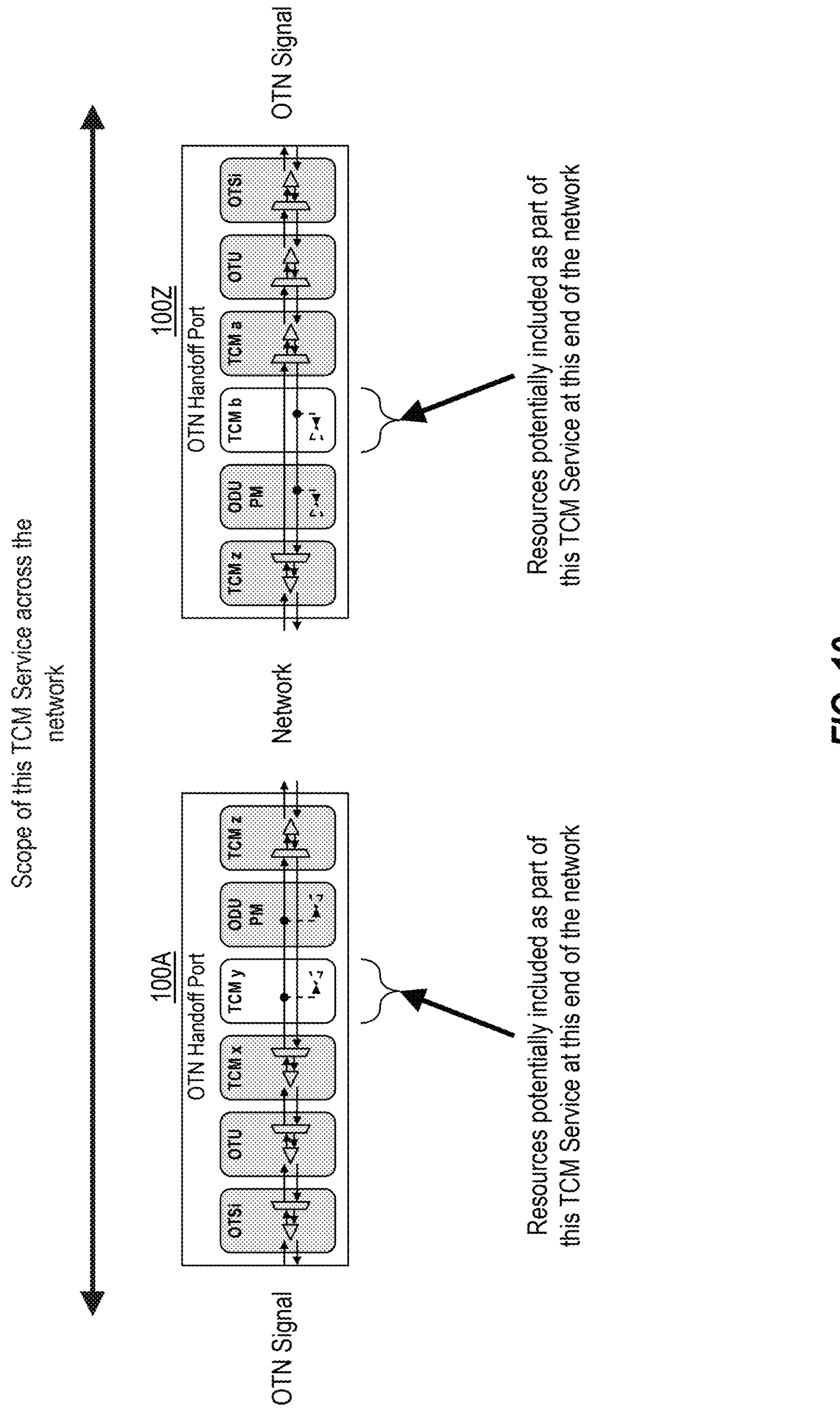
Figure 11:
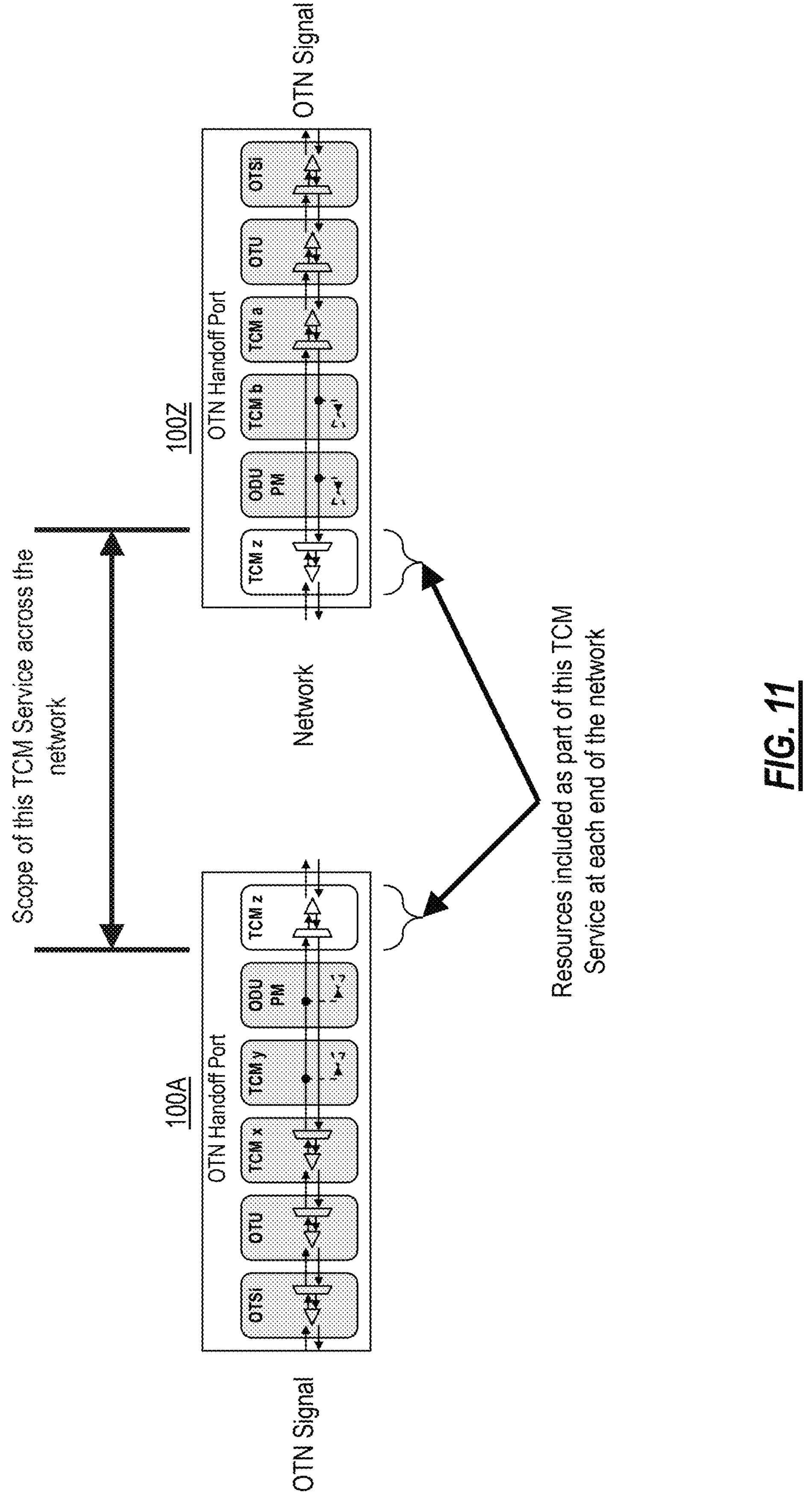
Figure 12:
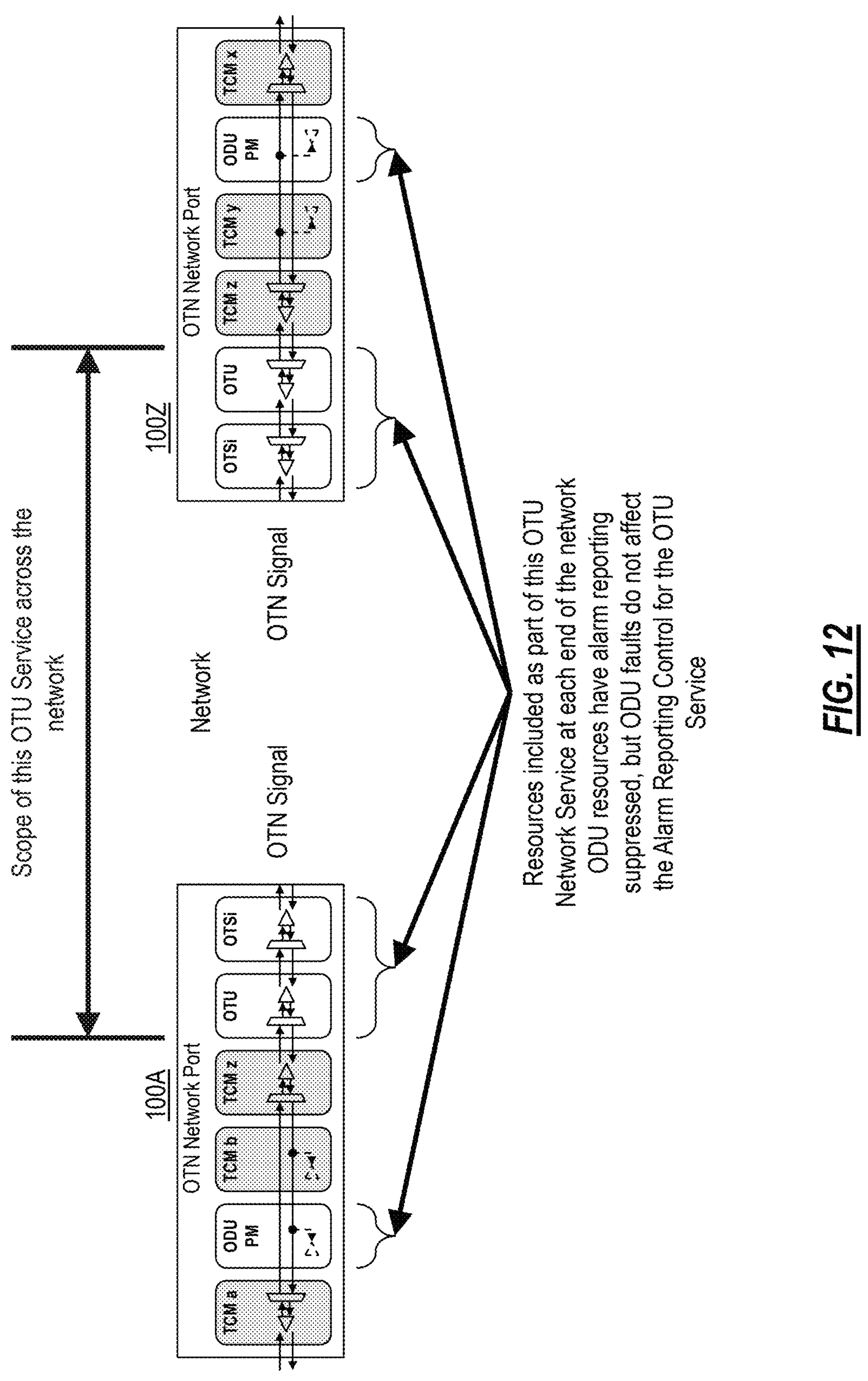
Figure 13:
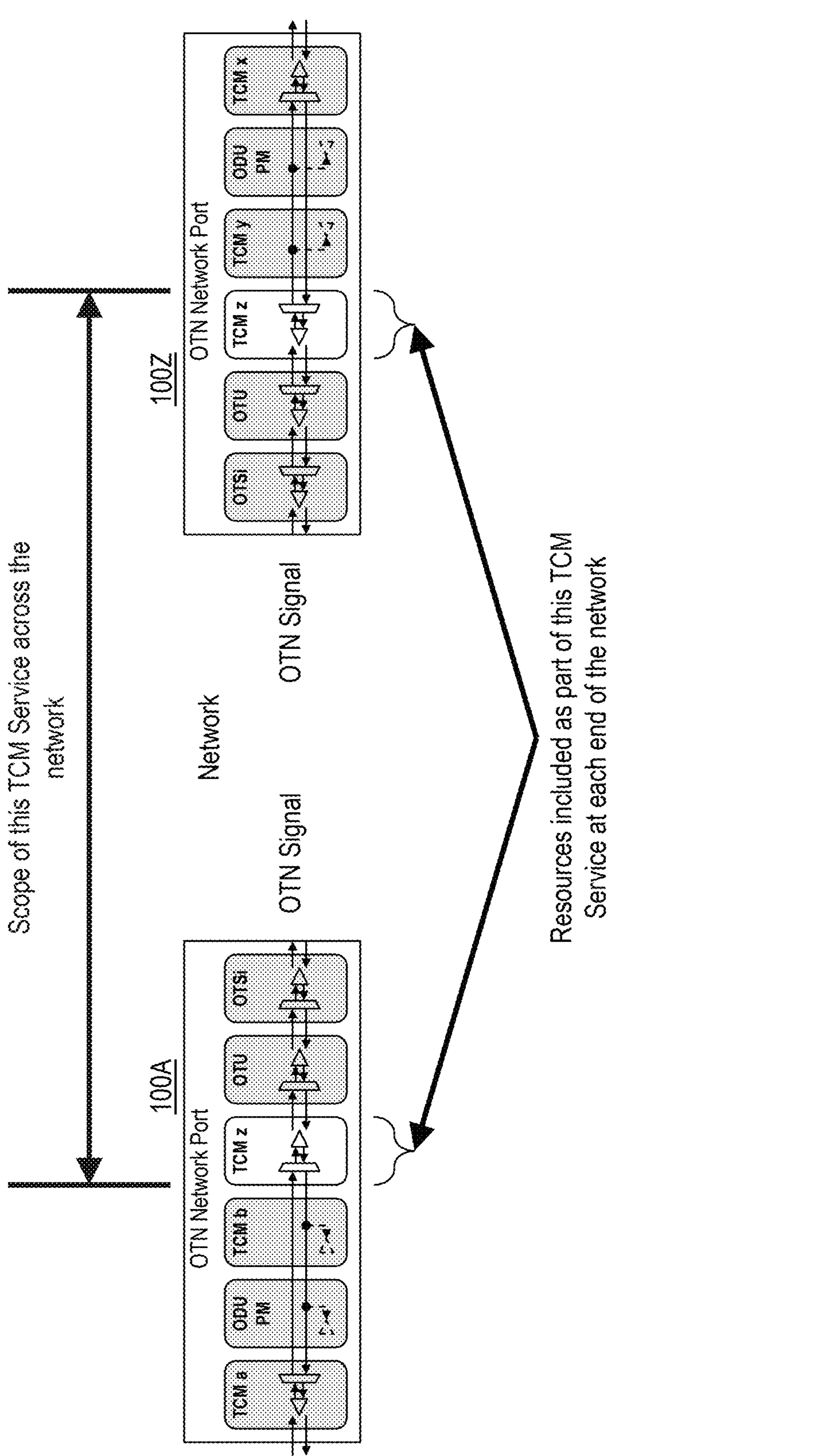
Figure 14:
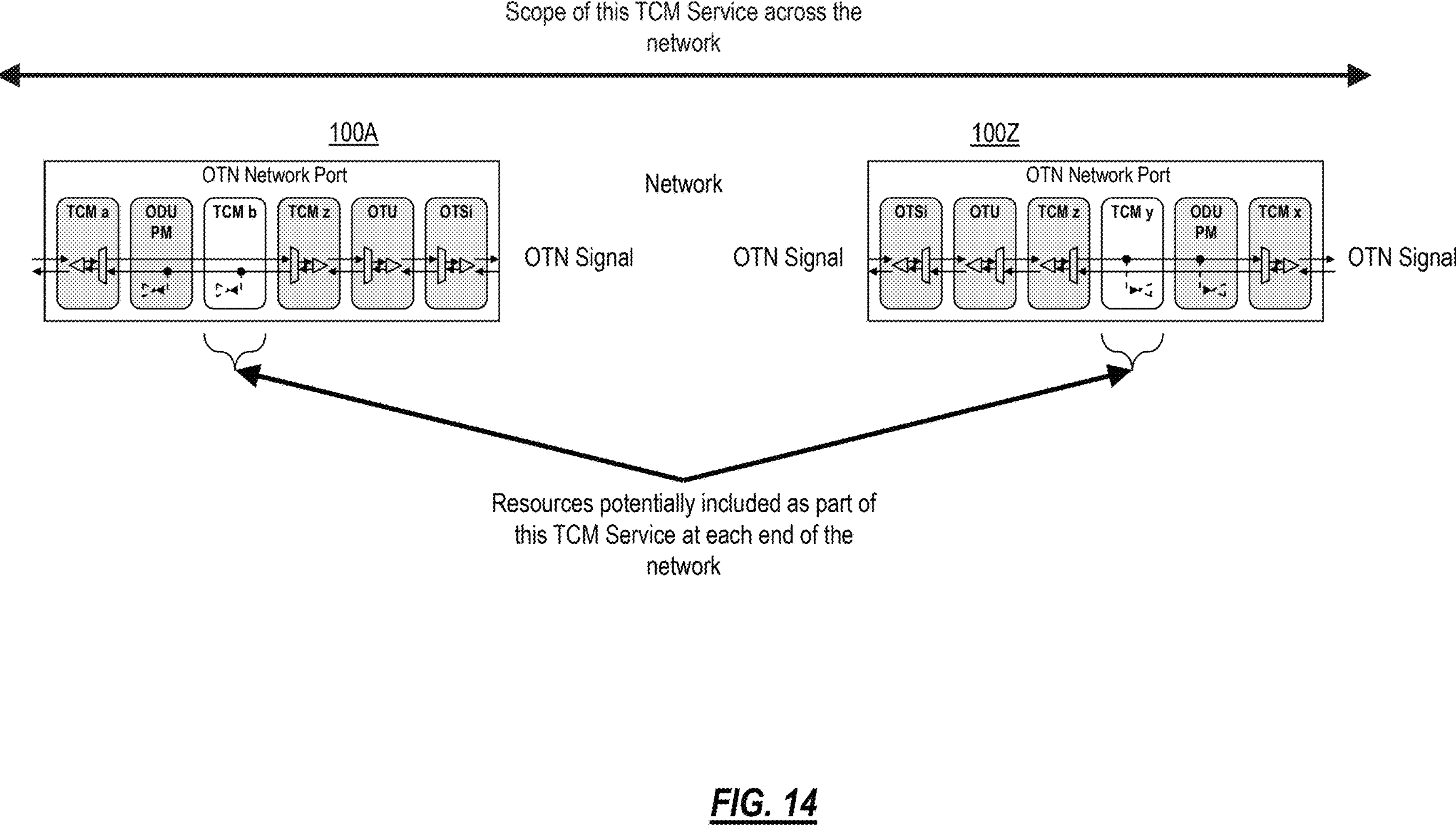
Figure 15:
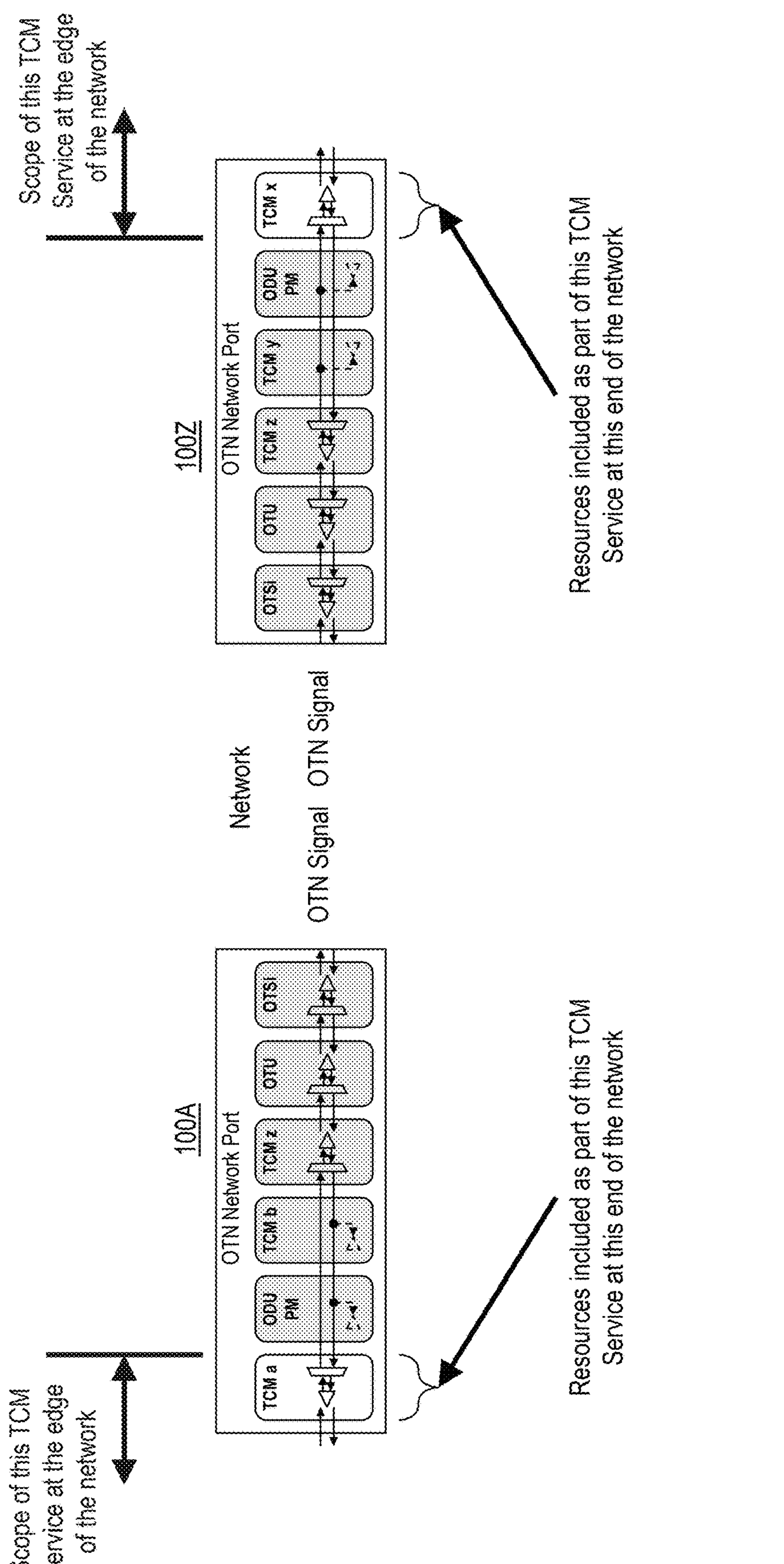

FIG. 9 illustrates a TCM Service which terminates on an OTU Handoff Port. FIG. 10 illustrates a TCM Service carried transparently through an OTU Handoff Port. FIG. 11 illustrates TCM Service across a network for a payload from an OTU Port. FIG. 12 illustrates an OTU Service (across a network). FIG. 13 illustrates a TCM Service which Terminates on an OTU Network Port. FIG. 14 illustrates a TCM Service carried transparently through an OTU Network. FIG. 15 illustrates TCM Service dropping from a payload of an OTU Network Port.

Process

Figure 16:
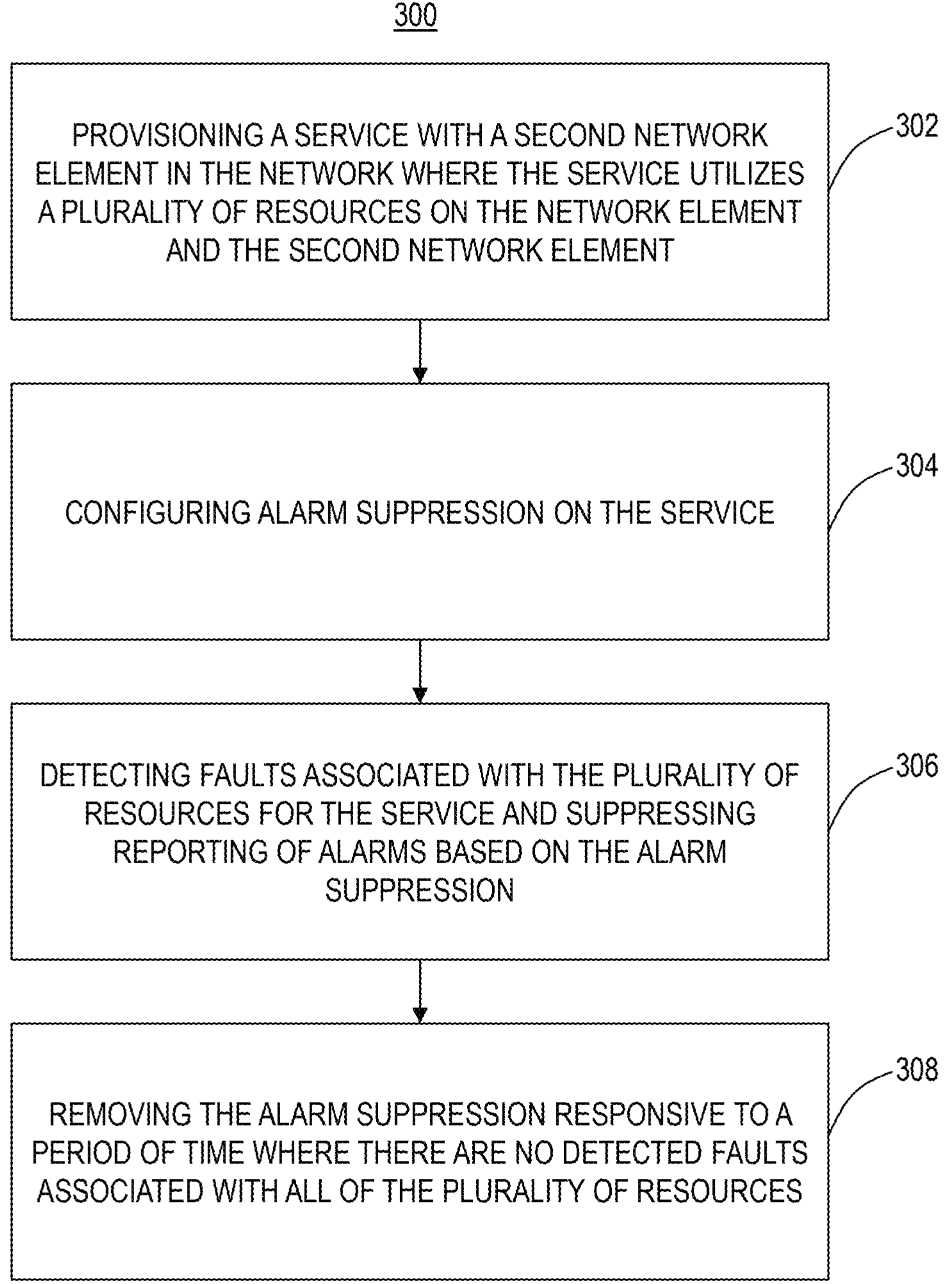
FIG. 16 is a flowchart of a process for alarm suppression in a network element with a plurality of ports configured to connect to a network.

FIG. 16 is a flowchart of a process 300 for alarm suppression in a network element with a plurality of ports configured to connect to a network. The process 300 contemplates implementation in the network element 100 or similar devices, e.g., via circuitry, a controller, etc. The process 300 includes provisioning a service with a second network element in the network where the service utilizes a plurality of resources on the network element and the second network element (step 302); configuring alarm suppression on the service (step 304); detecting faults associated with the plurality of resources for the service and suppressing reporting of alarms based on the alarm suppression (step 306); and removing the alarm suppression responsive to a period of time where there are no detected faults associated with all of the plurality of resources (step 308).

The process 300 can also include, subsequent to the removed alarm suppression, reporting any new alarms associated with the plurality of resources for the service to a management system. The plurality of resources include monitor points at the network element and the second network element, operating independently of one another, and wherein the monitor points include any of a network port, a client port, and intermediate points between the network port and the client port. The faults associated with the plurality of resources at the second network element include propagation of fault information from the second network element and faults coming from the network. The process 300 can also include monitoring the detected faults associated with the plurality of resources for the service and not start a timer until there are no detected faults associated with the plurality of resources. The alarm suppression can be controlled by one of Alarm Reporting Control (ARC) and Auto In-Service (AINS). The alarm suppression can be configured when the service is new or when the service is undergoing maintenance. The service can be one of based on Optical Transport Network (OTN), based on Flexible Optical Transport Network (FlexO), and Ethernet.

Network Element

In another embodiment, the network element 100 includes a plurality of ports configured to connect to a network; and circuitry configured to provision a service with a second network element in the network where the service utilizes a plurality of resources on the network element and the second network element, configure alarm suppression on the service, detect faults associated with the plurality of resources for the service and suppress reporting of alarms based on the alarm suppression, and remove the alarm suppression responsive to a period of time where there are no detected faults associated with all of the plurality of resources.

The circuitry can be further configured to, subsequent to the removed alarm suppression, report any new alarms associated with the plurality of resources for the service to a management system. The plurality of resources include monitor points at the network element and the second network element, operating independently of one another, and wherein the monitor points include any of a network port, a client port, and intermediate points between the network port and the client port. The faults associated with the plurality of resources at the second network element include propagation of fault information from the second network element and faults coming from the network. The circuitry can be further configured to monitor the detected faults associated with the plurality of resources for the service and not start a timer until there are no detected faults associated with the plurality of resources. The alarm suppression can be controlled by one of Alarm Reporting Control (ARC) and Auto In-Service (AINS). The alarm suppression can be configured when the service is new or when the service is undergoing maintenance. The service can be one of based on Optical Transport Network (OTN), based on Flexible Optical Transport Network (FlexO), and Ethernet.

Management System

In a further embodiment, the management system 108 includes one or more processors 202 and memory 208 storing instructions that, when executed, cause the one or more processors 202 to communicate with a plurality of network elements in a network, configure a service between two network elements of the plurality of network elements where the service utilizes a plurality of resources on the two network elements, configure alarm suppression on the service, where alarms associated with faults detected on the plurality of resources for the service detected at the two network elements are suppressed and not reported to the management system, and receive new alarms associated with faults detected on the plurality of resources for the service subsequent to passing of a period of time where there are no detected faults at the two network elements associated with all of the plurality of resources.

The plurality of resources include monitor points at the two network elements, operating independently of one another, and wherein the monitor points include any of a network port, a client port, and intermediate points between the network port and the client port. The alarm suppression can be controlled by one of Alarm Reporting Control (ARC) and Auto In-Service (AINS). The service can be one of based on Optical Transport Network (OTN), based on Flexible Optical Transport Network (FlexO), and Ethernet.

CONCLUSION

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments. Also, in the claims, the terms "comprise," "comprises," "comprising," "include," "includes," and "including" are intended to be non-limiting and open-ended. These terms specifically list essential elements or steps but do not exclude additional elements or steps. This applies even when a claim or series of claims includes more than one of these terms.

What is claimed is:

1. A network element comprising:

a plurality of ports configured to connect to a network; and circuitry configured to:

provision a service with a second network element in the network where the service utilizes a plurality of resources on the network element and the second network element, configure alarm suppression on the service, wherein the alarm suppression is service-level Alarm Reporting Control (ARC) or Auto In-Service (AINS) applied for the service as a whole such that a fault on any one of the plurality of resources prevents alarm reporting for all of the plurality of resources for the service, detect faults associated with the plurality of resources for the service and suppress reporting of alarms based on the alarm suppression, including correlating fault information across the plurality of resources comprising near-end faults, far-end faults, and reverse faults to provide a single-ended independent ARC/AINS function without requiring a communications channel to convey fault status along a service path, and remove the alarm suppression responsive to a period of time where there are no detected faults associated with all of the plurality of resources at both the network element and the second network element such that the service is up end-to-end across a network domain in both directions before any of the plurality of resources exits a not-reported state.

2. The network element of claim 1, wherein the circuitry is further configured to, subsequent to the removed alarm suppression, report any new alarms associated with the plurality of resources for the service to a management system, wherein the reporting includes Alarm Reporting Control correlation and deduplication to group related alarms and filter duplicates and includes threshold-based filtering such that only alarms exceeding defined criteria are reported.

3. The network element of claim 1, wherein the plurality of resources include monitor points at the network element and the second network element, operating independently of one another, and wherein the monitor points include any of a network port, a client port, and intermediate points between the network port and the client port.

4. The network element of claim 3, wherein the faults associated with the plurality of resources at the second network element include propagation of fault information from the second network element and faults coming from the network.

5. The network element of claim 1, wherein the circuitry is further configured to:

monitor the detected faults associated with the plurality of resources for the service and not start a timer until there are no detected faults associated with the plurality of resources for the service at both the network element and the second network element, and reset the timer responsive to detection of any fault associated with any one of the plurality of resources before expiration of the timer.

6. The network element of claim 1, wherein the alarm suppression is configured when the service is new or when the service is undergoing maintenance.

7. The network element of claim 1, wherein the service is one of:

based on Optical Transport Network (OTN), based on Flexible Optical Transport Network (FlexO), and Ethernet.

8. A method implemented in a network element comprising a plurality of ports configured to connect to a network, the method comprising steps of:

provisioning a service with a second network element in the network where the service utilizes a plurality of resources on the network element and the second network element;

configuring alarm suppression on the service, wherein the alarm suppression is service-level Alarm Reporting Control (ARC) or Auto In-Service (AINS) applied for the service as a whole such that a fault on any one of the plurality of resources prevents alarm reporting for all of the plurality of resources for the service;

detecting faults associated with the plurality of resources for the service and suppressing reporting of alarms based on the alarm suppression, including correlating fault information across the plurality of resources comprising near-end faults, far-end faults, and reverse faults to provide a single-ended independent ARC/AINS function without requiring a communications channel to convey fault status along a service path; and removing the alarm suppression responsive to a period of time where there are no detected faults associated with all of the plurality of resources at both the network element and the second network element such that the service is up end-to-end across a network domain in both directions before any of the plurality of resources exits a not-reported state.

9. The method of claim 8, wherein the steps further include:

subsequent to the removed alarm suppression, reporting any new alarms associated with the plurality of resources for the service to a management system, wherein the reporting includes Alarm Reporting Control correlation and deduplication to group related alarms and filter duplicates and includes threshold-based filtering such that only alarms exceeding defined criteria are reported.

10. The method of claim 8, wherein the plurality of resources include monitor points at the network element and the second network element, operating independently of one another, and wherein the monitor points include any of a network port, a client port, and intermediate points between the network port and the client port.

11. The method of claim 10, wherein the faults associated with the plurality of resources at the second network element include propagation of fault information from the second network element and faults coming from the network.

12. The method of claim 8, wherein the steps further include:

monitoring the detected faults associated with the plurality of resources for the service and not starting a timer until there are no detected faults associated with the plurality of resources for the service at both the network element and the second network element, and reset the timer responsive to detection of any fault associated with any one of the plurality of resources before expiration of the timer.

13. The method of claim 8, wherein the alarm suppression is configured when the service is new or when the service is undergoing maintenance.

14. The method of claim 8, wherein the service is one of:

based on Optical Transport Network (OTN), based on Flexible Optical Transport Network (FlexO), and Ethernet.

15. A non-transitory computer-readable medium comprising instructions that, when executed, cause one or more processors to execute steps of:

communicating with a plurality of network elements in a network;

configuring a service between two network elements of the plurality of network elements where the service utilizes a plurality of resources on the two network elements;

configuring alarm suppression on the service, where alarms associated with faults detected on the plurality of resources for the service detected at the two network elements are suppressed and not reported, wherein the alarm suppression is service-level Alarm Reporting Control (ARC) or Auto In-Service (AINS) applied for the service as a whole such that a fault on any one of the plurality of resources prevents alarm reporting for all of the plurality of resources for the service, and wherein fault information across the plurality of resources comprising near-end faults, far-end faults, and reverse faults is correlated to provide a single-ended independent ARC/AINS function at each of the two network elements without requiring a communications channel to convey fault status along a service path; and receiving new alarms associated with faults detected on the plurality of resources for the service subsequent to passing of a period of time where there are no detected faults associated with all of the plurality of resources on the two network elements such that the service is up end-to-end across a network domain in both directions before any of the plurality of resources exits a not-reported state.

16. The non-transitory computer-readable medium of claim 15, wherein the plurality of resources include monitor points at the two network elements, operating independently of one another, and wherein the monitor points include any of a network port, a client port, and intermediate points between the network port and the client port.

17. The non-transitory computer-readable medium of claim 15, wherein the service is one of:

based on Optical Transport Network (OTN), based on Flexible Optical Transport Network (FlexO), and Ethernet.

* * * * *